March 15, 1949. S. GOTTLIEB 2,464,304
METHOD OF AND SHAFT KILN FOR BURNING, CALCINING,
OR SINTERING, GRANULATED OR BRIQUETTED MATERIALS
Filed Feb. 8, 1945 2 Sheets-Sheet 2

Inventor:
Steven Gottlieb
by Leonhard A. Marx
Attorney

Patented Mar. 15, 1949

2,464,304

UNITED STATES PATENT OFFICE 2,464,304

METHOD OF AND SHAFT KILN FOR BURNING, CALCINING, OR SINTERING, GRANULATED OR BRIQUETTED MATERIALS

Steven Gottlieb, Nesher-Yagur, near Haifa, Palestine

Application February 8, 1945, Serial No. 576,863
In Palestine August 10, 1944

12 Claims. (Cl. 263—29)

This invention relates to the thermal treatment of granulated or briquetted material, such as, for example, the burning and sintering operations occurring in the manufacture of Portland cement or Sorel cement; the decomposition of limestone, dolomite or magnesite in the manufacture of the corresponding oxides, or the calcination of ores.

The invention has as its object to provide a new method allowing such operations, which will hereinafter be referred to as "burning," to be carried out by means of an oil-operated shaft kiln, and a new type of shaft kiln for carrying out the new method. The problems underlying this invention, and the advantages gained by the solution found through this invention, will be set out hereinafter with reference to Portland cement, but it is to be understood that the invention applies mutatis mutandis also to many other purposes and that the use of the method and kiln according to this invention for such other purposes is deemed to be comprised within the scope of the present specification and the appended claims.

In the manufacture of Portland cement, the use of shaft kilns has in the main been restricted to coal-operated ones. Oil-operated shaft kilns, which are provided with circumferentially located, radially arranged atomizer and burner chambers, have been proposed for burning quicklime but they could not successfully be applied to the manufacture of cement.

On the other hand, coal-operated shaft kilns have certain disadvantages which would make it preferable to operate the kiln with oil, quite apart from the fact that at many places, oil is easier and more cheaply available than coal. The main disadvantages are the following:

Only special kinds of coal containing a low percentage of volatile constituents can be used, e. g. coke and anthracite, and the combustion speed of granulated coke and anthracite is low, thus limiting the output of the kiln. The coal, which is pressed into the briquettes ignites only at a high temperature, that is, near the sintering zone of the kiln. Now it happens frequently in coal-operated shaft kilns, mostly near the lining, that the temperature of the sintering zone drops below the ignition temperature of the coal, and much laborious work is required in order to get the sintering zone hot again. For this reason, a coal-operated shaft kiln cannot be run in a fully mechanic and automatic way. Thus, the operation of such kilns demands much skill and experience, and the aforesaid irregularities of its operation are the cause of unavoidable and heavy losses of heat and a concomitant decrease of output. The charge tends to clog and to stick to the refractory lining, thereby damaging the latter, owing to the ash of the coal. The high alkali content of this ash is, moreover, the cause of the well-known dust nuisance which makes itself felt in the neighbourhood of the kiln. All these reasons work together in making the operation of the kiln very sensitive to fluctuations in the composition of the charge which makes it necessary to provide an exact proportioning and admixing of the coal to the raw mix, with careful observation of the weight, grain-composition and moisture contents of the coal.

These and other considerations have resulted therein that other kiln systems are preferred to the shaft kilns, e. g. the rotary kiln and the Lepol kiln, although the high thermal efficiency of the shaft kiln has always remained an argument in its favour.

The efficiency of rotary kilns is low for two main reasons: losses of heat due to internal radiation are much greater than in a shaft kiln, owing to the large space filled with thermally "transparent" gases through which a large amount of heat of high temperature ("high-grade heat") can freely radiate from the hot parts of the kiln to the colder parts thereof without being utilized for any useful purpose, whilst in the shaft kiln the internal radiation is largely absorbed by the briquettes of the charge. Moreover, the installation of the rotary kiln requires a great investment, their operation can be made economically only on a relatively large scale, and they are difficult to stop in the case of trouble since they have to be completely cooled down. This is a long procedure, during which time the kiln must be rotated in order to avoid warping of the shell, and in addition, the stoppage is practically always connected with damage to the firebrick lining.

The Lepol kiln represents an attempt at overcoming the heat losses aforesaid. In it, a "sintering grate," where heat exchange by way of convection is provided, is coupled with a rotary kiln much shorter than usual. This arrangement has mechanical disadvantages since the problems of coupling the said two parts of the kiln with the pre-heater, dust collector and other accessory apparatus are considerable. The capital investment required is equally high.

The present invention starts from the assumption that practically all the disadvantages enumerated hereinbefore of the coal-operated shaft kiln on the one hand, and of the rotary and Lepol kilns on the other hand, can be avoided by a suitably devised, directly fired shaft kiln using liquid fuel. It will be shown hereinafter that these disadvantages are in fact overcome by the present invention.

The invention consists in a method of burning granulated or briquetted materials in a shaft kiln, wherein liquid fuel and an amount of primary air insufficient for the complete combustion of the fuel are introduced under pressure from the top of the kiln into an intermediate zone thereof where a minor part of the fuel is burnt and, by the heat thereby generated, the bulk of the fuel is gasified and possibly cracked, whereby a hot mixture of combustion gases and combustible gases is produced; secondary air is introduced under pressure from the bottom end of the kiln; and the gas mixture aforesaid and the secondary air are caused to mix whereby a sintering zone of regulable depth and location is produced.

It has been ascertained that in this manner, an even distribution of the combustion gases and heat throughout the cross-section of the kiln is obtained.

In a preferred embodiment of the invention, an atomized burner is provided in the upper part of the kiln in axial position; ducts for the fuel, primary air and a gaseous atomizing medium lead from the top of the kiln to said burner; the primary combusion takes place in an axially located empty space created by the natural slope of the charge beneath the burner, and the feeding pressure and temperature of the primary air, fuel and atomizing medium on the one hand and of the secondary air on the other hand are so regulated that, having regard to the pressure drop within the charge, the gas mixture created by the primary combustion penetrates down to a level somewhat beneath the burner and the sintering zone extends from such level up to a level well above the burner.

The flue gases may be admixed to the primary air, as known per se, for the regulation of the temperature thereof.

The invention also consists in an oil-operated shaft kiln adapted for carrying out the method aforesaid, which comprises, besides the usual accessories, feed ducts for oil and primary air entering the kiln in its top part and descending in the axis of the kiln; a burner arranged at the bottom end of said feed ducts; and means for introducing secondary air into the bottom part of the kiln.

In a shaft kiln according to this invention, the primary air duct may be a metal pipe located in the axis of the kiln and having a bent above which the pipe extends obliquely towards the top end of the kiln. The lower end of the pipe is suitably widened into a cone or bell. The pipe, and more particularly its vertical portion, may be externally covered by a firebrick masonry suspended by a number of braces secured to the top of the kiln. The conduits for the fuel and atomizing medium, on the other hand, may be constituted by flexible pipes loosely inserted in said primary air pipe, and the burner may be secured to the lower ends of said conduits. The unit formed by the conduits and burner can thus be withdrawn and exchanged, if required.

The secondary air is suitably introduced through the rotary grate with which most shaft kilns are usually fitted.

The invention is illustrated, by way of example only, in the accompanying drawing in which.

Figure 1:
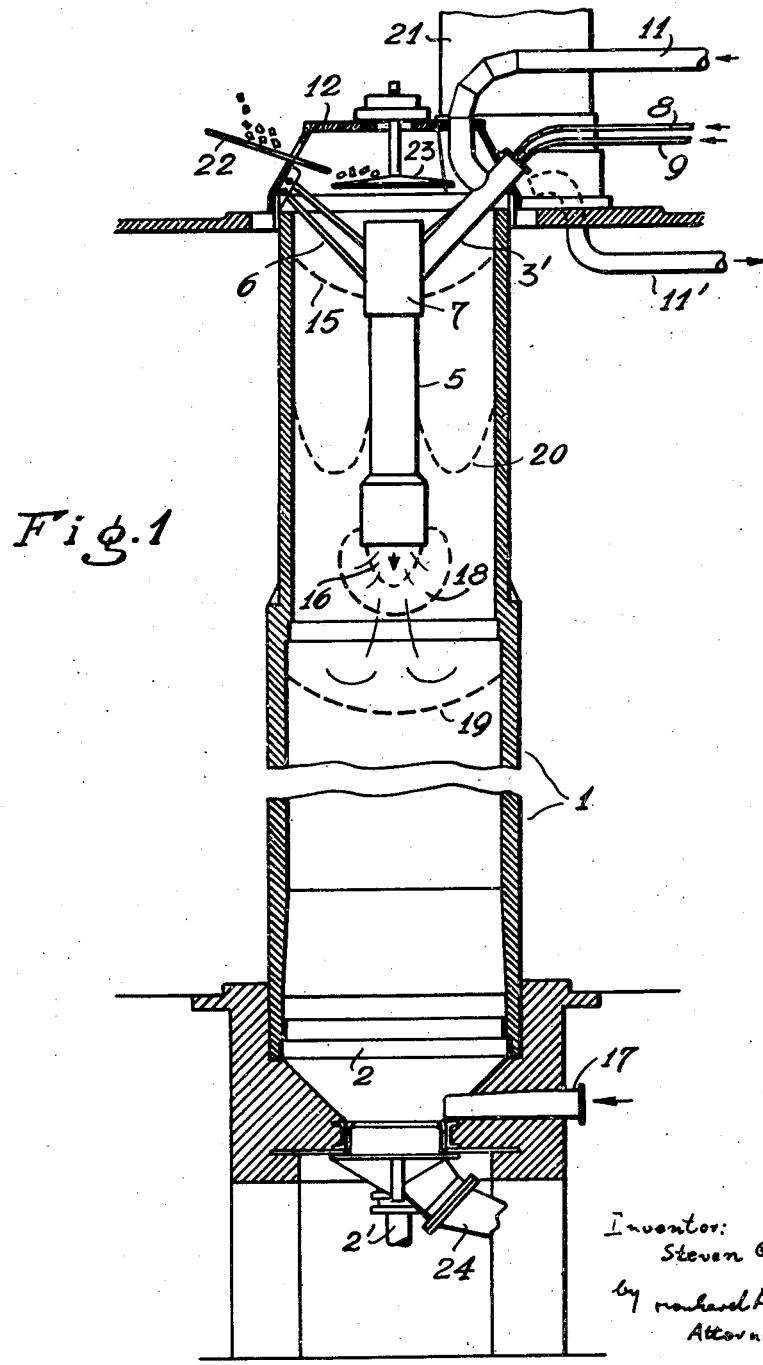
Fig. 1 shows an axial section of a kiln according to this invention.
Figure 2:
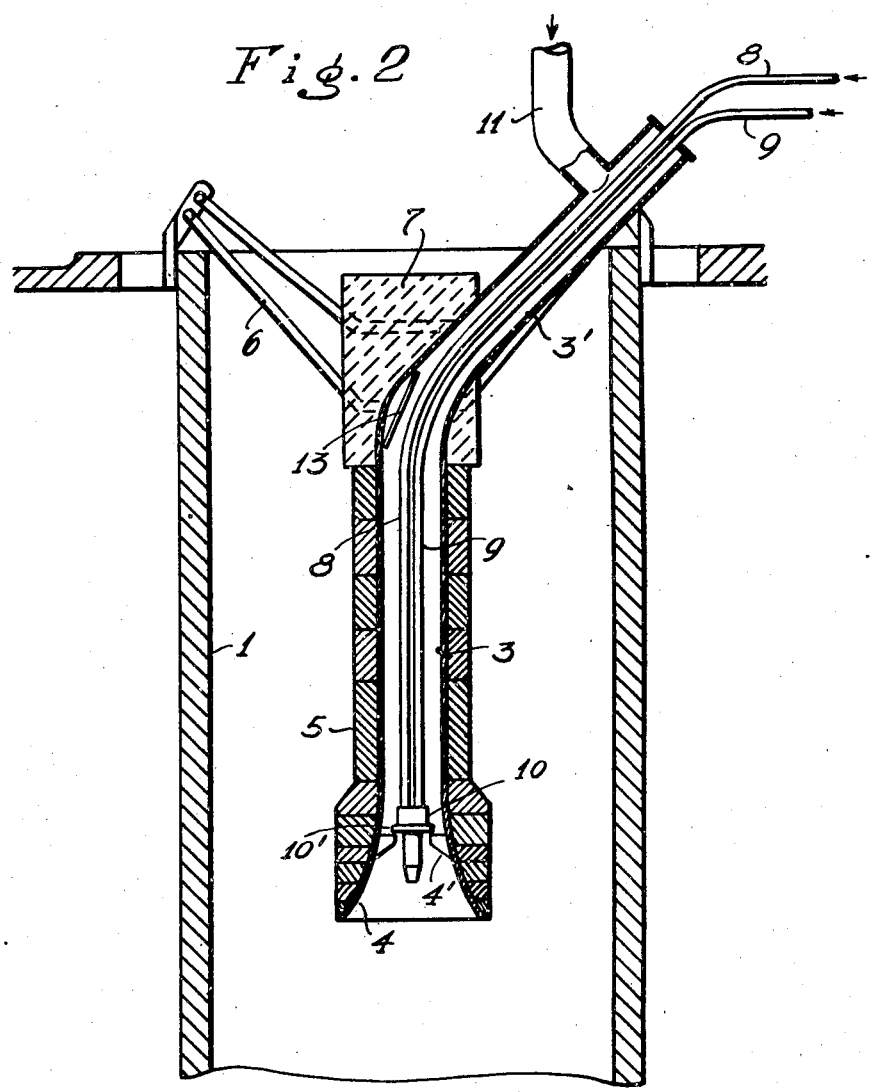
Fig. 2 is a fragmentary axial section of its upper part on a larger scale.

The kiln here shown has a usual shell 1 with internal firebrick lining and is provided at its bottom with a rotary grate 2 driven by a drive 2' with adjustable speed, as known per se. In the top part of the kiln, a pipe of cast iron or any other suitable metal is arranged, with a vertical section 3 co-oxial with the kiln and an upper branch 3' which leads obliquely out of the kiln. At its bottom end, the pipe 3 flares into a conical part 4 (which may also be spherical or bell-shaped or of similar form). The part 4 may consist of a refractory casting. It may be water-cooled, if desired, for example by means of a cooling coil (not shown) arranged within part 4, and water conduits (not shown) will then be arranged inside pipe 3 or within the masonry 5 (see below). Or else, the cone or bell may be made from a spirally wound steel pipe supplied with cooling water in the manner aforesaid. The vertical portion of pipe 3 as well as its flared part 4 are externally covered by a firebrick masonry 5 which is suspended from the top of the kiln by a number of steel braces 6 the inner ends of which are anchored in a refractory concert block 7 cast on top of the masonry 5. This block, too, may be lined on its surface with firebricks. Loosely inserted in pipe 3, 3' a flexible oil feed conduit 8 and a similar conduit 9 for the atomizing medium, say air or steam, lead from outside the kiln to the burner 10 which is fixed to said conduits and located at the lower end of pipe 3 just above the cone 4. A centering ring 10' is made integral with the burner, while ribs 4' are provided at the upper end of the cone 4 in its interior on which the ring 10' rests. To the upper part of branch 3' outside the kiln, a primary air conduit 11 with throttle (not shown) is connected. Through a conduit 11', flue gas can be drawn from the chimney and be admixed to the primary air in conduit 11, or provision may be made for gas to be drawn from other (hotter) zones of the kiln. In the bend of pipe 3, a mirror 13 is arranged so that the interior of the kiln beneath the burner can be observed from outside through pipe 3'. The top of the kiln is covered by a hood 12 from which the chimney 21 is branched off. The brisquette feeder 22 enters from outside into the hood 12. From the feeder, the briquettes fall in a distributor 23 which distributes them into the annular space of the kiln round block 7 and the masonry 5. To the bottom end of the kiln, a discharge pipe 24 is connected, leading to three alternately operated valves, while a secondary-air duct 17 leads into said bottom part beneath the rotary grate 2.

The briquettes are prepared in a manner and in a size known per se, approximately 1 by 2", with an appropriate water content depending on the quality and fineness of the raw material, e. g. of about 14% by weight, and the kiln is filled with them up to the dotted line 15. By the natural slope of the briquettes a space 16 of about paraboloid shape forms beneath the cone 4. Primary air and flue gas is blown-in through pipes 11 and 11', 3' and 3, secondary air through duct 17, and oil is fed through duct 8 to the burner 10 and atomized by pressure or by means of compressed air or steam introduced through duct 9. In the empty space 16 beneath the burner and in an about hemispherical portion 18 of the charge round this space, a primary and very incomplete combustion takes place which serves for gasifying the not-burnt main portion of the fuel oil, whereby also a partial cracking of the latter takes place. The mixture of combustion gases and combustible gases descends in the charge down to a zone approximately indicated by the dotted line 19 and mixes with the secondary air, and complete combustion occurs in the sintering zone which extends from level 19 up to a level approximately indicated by the dotted line 20. It is easily understandable that by the change of direction forced upon the primary combustion mixture by the secondary air, the resulting complete combustion mixture is evenly spread throughout the whole cross section of the kiln. This makes it possible so to regulate the feed and temperature of oil, primary and secondary air, the briquette feed and the grate speed, that a continuous high output of high quality cement can be secured in a fully automatic way, and there is no danger of clogging or other operational trouble.

Experiments have shown that from the point of view of heat consumption, expressed in calories per kilogram of clinker, the kiln according to this invention compares favourably with all known kinds of cement kilns. In the table hereinbelow, column A indicates the heat consumption and column B the output of the kiln in tons per day for the kilns chosen for comparison:

| | A | B |
|---|---|---|
| Rotary kiln (wet process with Unax cooler and heat-exchange chains) | 1,650 | 320 |
| Modern shaft kiln, anthracite briquetted with raw-mix | 1,150 | 100 |
| Lepol kiln | 1,050 | 200 |
| Kiln according to the invention | 1,150 | 100 |

For the rest, the advantages obtained by the present invention are self-explanatory in view of the detailed statements made above as regards the disadvantages of known kilns, for it results from the preceding description of the kiln according to this invention, that these disadvantages do not occur therewith.

I claim:

1. A method of burning granulated or briquetted material, comprising feeding said material into the top part of a shaft kiln and allowing it to descend through said kiln; separately introducing under pressure liquid fuel and an amount of primary air insufficient for the complete combustion of the fuel from the top part of the kiln into an intermediate zone thereof, causing said fuel and air to mix in said intermediate zone and causing a minor portion of said fuel to be burnt by said air for the generation of a mixture of gasified fuel and gaseous combustion products; introducing secondary air under pressure into the bottom part of the kiln and allowing it to rise in the kiln and to mix with the said mixture of gases for burning said gasified fuel, thereby producing a sintering zone across the kiln within said material below and above the level where the fuel and primary air mix, and adjusting the height and location of the sintering zone by adjusting the currents of primary and secondary air; and withdrawing the burnt material from the bottom part of the kiln.

2. A method of burning granulated or briquetted material, comprising feeding said material into the top part of a shaft kiln and allowing it to descend through said kiln; separately introducing under pressure liquid fuel and an amount of primary air insufficient for the complete combustion of the fuel from the top part of the kiln substantially along its axis, causing said fuel and air to mix in said intermediate zone and causing a minor portion of said fuel to be burnt by said air for the generation of a mixture of gasified fuel and gaseous combustion products; introducing secondary air under pressure into the bottom part of the kiln and allowing it to rise in the kiln and to mix with the said mixture of gases for burning said gasified fuel, thereby producing a sintering zone across the kiln within said material below and above the level where the fuel and primary air mix, and adjusting the height and location of the sintering zone by adjusting the currents of primary and secondary air; and withdrawing the burnt material from the bottom part of the kiln.

3. A method of burning granulated or briquetted material, comprising feeding said material into the top part of a shaft kiln and allowing it to descend through said kiln; separately introducing under pressure liquid fuel, an atomizing medium and an amount of primary air insufficient for the complete combustion of the fuel from the top part of the kiln into an intermediate zone thereof, atomizing the fuel and causing said atomized fuel and air to mix in said intermediate zone and causing a minor portion of said fuel to be burnt by said air for the generation of a mixture of gasified fuel and gaseous combustion products; introducing secondary air under pressure into the bottom part of the kiln and allowing it to rise in the kiln and to mix with the said mixture of gases for burning said gasified fuel, thereby producing a sintering zone across the kiln within said material below and above the level where the fuel and primary air mix, and adjusting the height and location of the sintering zone by adjusting the currents of primary and secondary air; and withdrawing the burnt material from the bottom part of the kiln.

4. In a shaft kiln in combination: separate ducts for fuel and primary air entering the kiln in its top part and descending substantially in its axis into an intermediate zone thereof; a burner arranged at the lower end of said ducts said burner exhausting in a down direction; and means for introducing secondary air into the bottom part of the kiln in an upward direction.

5. In a shaft kiln in combination: a primary-air duct entering the kiln at its top, said duct comprising an oblique section descending towards the axis of the kiln, and a vertical section descending further substantially along the axis of the kiln into an intermediate zone thereof; separate ducts for fuel and an atomizing medium inserted in said primary-air duct; an atomizer burner secured to the lower ends of said fuel and atomizing-medium ducts at the lower end of said primary-air duct said burner exhausting in a downward direction; and means for introducing secondary air into the bottom part of the kiln in an upward direction.

6. In a shaft kiln in combination: a primary-air duct entering the kiln at its top, said duct comprising an oblique section descending towards the axis of the kiln, and a vertical section descending further substantially along the axis of the kiln into an intermediate zone thereof, said vertical section having a widened lower end; separate ducts for fuel and an atomizing medium inserted in said primary-air duct; an atomizer burner secured to the lower ends of said fuel and atomizing-medium ducts at the lower end of said primary-air duct said burned exhausting in a downward direction; and means for introducing secondary air into the bottom part of the kiln in an upward direction.

7. In a shaft kiln in combination: a primary-air duct entering the kiln at its top, said duct comprising an oblique section descending towards the axis of the kiln, and a vertical section descending further substantially along the axis of the kiln into an intermediate zone thereof, said vertical section having a widened lower end; separate flexible ducts for fuel and an atomizing medium removably inserted in said primary-air duct; an atomizer burner secured to the lower ends of said fuel and atomizing-medium ducts at the lower end of said primary-air duct said burner exhausting in a downward direction; and means for introducing secondary air into the bottom part of the kiln in an upward direction.

8. In a shaft kiln in combination: a primary-air duct entering the kiln at its top, said duct comprising an oblique section descending towards the axis of the kiln, and a vertical section descending further substantially along the axis of the kiln into an intermediate zone thereof, said vertical section having a widened lower end; separate ducts for fuel and an atomizing medium inserted in said primary-air duct; an atomizer burner secured to the lower ends of said fuel and atomizing-medium ducts at the lower end of said primary-air duct said burner exhausting in a downward direction; a fireback lining surrounding at least said vertical section of the primary-air duct; and means for introducing secondary air into the bottom part of the kiln in an upward direction.

9. In a shaft kiln in combination: a primary-air duct entering the kiln at its top, said duct comprising an oblique section descending towards the axis of the kiln, and a vertical section descending further substantially along the axis of the kiln into an intermediate zone thereof, said vertical section having a widened lower end; separate ducts for fuel and an atomizing medium inserted in said primary-air duct; an atomizer burner secured to the lower ends of said fuel and atomizing-medium ducts at the lower end of said primary-air duct, said burner exhausting in a downward direction; a firebrick lining surrounding at least said vertical section of the primary-air duct, and braces for suspending said primary-air duct and lining from the top part of the kiln; and means for introducing secondary air into the bottom part of the kiln in an upward direction.

10. In a shaft kiln as claimed in claim 5, a mirror arranged in the primary-air duct in the transition between the oblique and vertical sections thereof, said mirror being so adjusted as to allow observation of the interior of the kiln through said duct from the top part of the kiln.

11. A shaft as claimed in claim 6, wherein the widened lower end of the vertical section of the primary-air duct is made from a heat-resistant casting.

12. A shaft kiln as claimed in claim 6, wherein the widened lower end of the vertical section of the primary-air duct consists of a spirally wound metal pipe adapted to serve as a duct for the circulation of cooling water.

STEVEN GOTTLIEB.

REFERENCES CITED

The following references are of record in the file of this patent:

UNITED STATES PATENTS

| Number | Name | Date |
|---|---|---|
| 740,360 | Hannes | Sept. 29, 1903 |
| 865,659 | Scott | Sept. 10, 1907 |
| 1,893,913 | Saint-Jacques | Jan. 10, 1933 |
| 2,002,496 | Freeman | May 28, 1935 |
| 2,194,454 | Greenwalt | Mar. 19, 1940 |
| 2,199,384 | Azbe | May 7, 1940 |
| 2,222,585 | Riggs | Nov. 19, 1940 |
| 2,345,067 | Osann | Mar. 28, 1944 |

FOREIGN PATENTS

| Number | Country | Date |
|---|---|---|
| 828,944 | France | June 3, 1938 |